United States Patent [19]
Andersen

[11] Patent Number: 5,398,578
[45] Date of Patent: Mar. 21, 1995

[54] BREAKAWAY GUIDE

[76] Inventor: Jens H. Andersen, 757 N. 10th St., Cottage Grove, Oreg. 97424

[21] Appl. No.: 975,065

[22] Filed: Nov. 12, 1992

[51] Int. Cl.⁶ .............................................. B26D 5/00
[52] U.S. Cl. .................................... 83/829; 83/821
[58] Field of Search ........................ 30/371, 282, 289; 83/13, 821, 829

[56] References Cited

U.S. PATENT DOCUMENTS

| | | | |
|---|---|---|---|
| 381,423 | 4/1888 | Robinson | 83/829 |
| 389,179 | 9/1888 | Viquesney | 83/829 |
| 394,110 | 12/1888 | Fraser | 83/829 |
| 532,828 | 1/1895 | Smalley | 83/821 |
| 1,840,731 | 1/1932 | Mathews et al. | 83/829 |
| 5,099,580 | 3/1992 | Stegall et al. | 30/371 |
| 5,123,168 | 6/1992 | Lyons | 30/371 |

Primary Examiner—Richard K. Seidel
Assistant Examiner—Hwei-Siu Payer
Attorney, Agent, or Firm—Marger Johnson McCollom & Stolowitz

[57] ABSTRACT

A guide for a circular saw blade provides lateral support for the saw blade when cutting a work piece such as a log. The guide rotates vertically upward and laterally away from the saw blade if the work piece is high enough to extend above the bottom of the guide. Thus the guide provides lateral support for the saw blade without limiting the height of cut that the saw blade can extend into the work piece.

11 Claims, 2 Drawing Sheets

BREAKAWAY GUIDE

BACKGROUND OF THE INVENTION

Circular saw blades are used to make longitudinal cuts through logs. The saw blades must have a large enough diameter or cut capacity to cut completely through the log from top to bottom. The saw cut capacity is defined by the diameter of the saw blade and the amount of saw blade that extends above a given work surface. For example, a circular saw blade typically contains an upper portion that extends above a support surface or table. The upper portion of the saw blade that actually cuts into the log of work piece is defined as the saw blade work surface and the distance from the top of the table, or the lowest location on the saw blade that actually cuts into the wood, to the top of the saw blade is defined as the saw blade cut capacity.

To prevent bending, saw blades are often supported, guided, or stabilized with guides. The guides are typically located on the lower half of the circular saw blade underneath the table that supports the log or board while being cut. Historically guides have not been positioned in the working surface of the saw blade that extends above the table and through the wood since the guide would restrict the cut capacity of the saw.

Regardless of where guides are normally located, there is a segment of rotational travel along the outside edge of the saw blade where no guidance is provided. Depending upon how far the circular saw blade extends above the table, the segment of the saw blade actually cutting into the wood at any one time can include up to a 180 degree segment of the saw blade. Throughout this range, or arc of unsupported rotation, the saw blade has a tendency to vibrate and move away from a preexisting desired alignment. Saw blade vibration and movement create rougher cut surfaces on the wood product and wedge shaped and other improperly sized boards that are either too thick or too thin. The problems with saw blade vibration and movement become worse the thinner the saw blades.

For deeper cuts (i.e., cuts that cut further into the wood), the saw blade cutting capacity must be increased by using either a larger diameter saw blade or by extending a greater portion of the saw blade above the log support table. Larger saw blades, however, have a greater width to retain enough rigidity so that the saw blade does not bend or vibrate as described above. Wider saw blades, however, cut a wider kerf that reduce the amount of usable wood product extractable from the log or board.

SUMMARY OF THE INVENTION

The present invention relates to saw guides for circular saws used predominantly for the primary breakdown of logs. The device provides support and directional influence to the saw prior to its engagement with the wood. Since any appendage to a circular saw within its working arc limits its depth of cut, guides providing influence and support to the blade above and below the stock being sawn are not in general use due to its limiting factor. Hence the pivoting breakaway feature of the described invention.

The guide is made of suitable metal except the contact material and is rigidly supported near the saw being in contact with it near the rim at a point prior to the saws entry into the material to be cut (FIG. 1).

DETAILED DESCRIPTION

Figure 1:
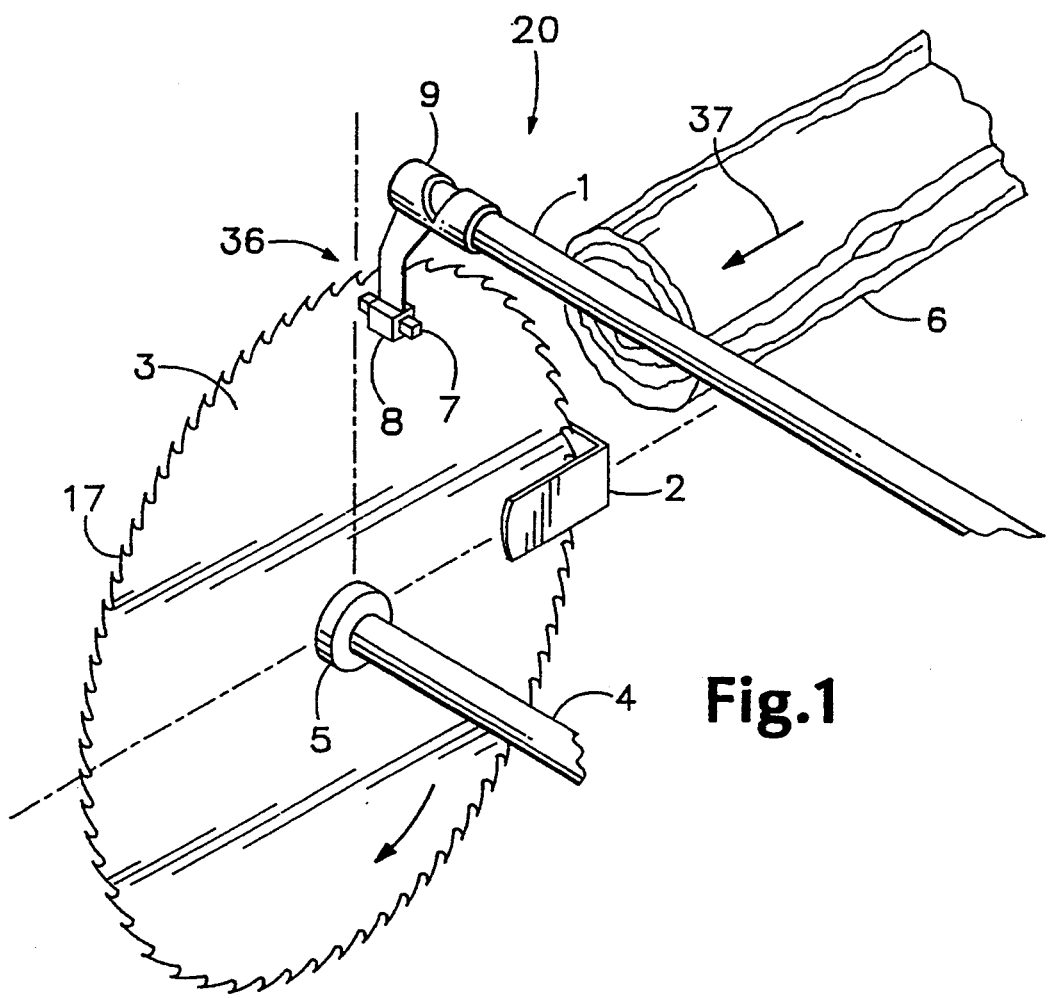
FIG. 1 shows a guidance deice in use with a saw blade.

FIG. 1 shows a guidance device 20 according to the invention and its position in relation to a traditionally located guide 2. A mounting pipe 1, which also serves as a fundamental part of the device, is solidly mounted perpendicular to a vertically aligned cutting plane of a saw blade 3. Pipe 1 is parallel to a saw arbor 4 and is located a given distance from arbor 4 so that a low friction rod 7 supported in a guide tube 8 makes contact with the side of saw blade 3 below teeth 17. The saw blade 3 is held onto the arbor 4 with a collar 5. The guidance device 20 is positioned 90 degrees from the traditional guide 2.

Figure 2:
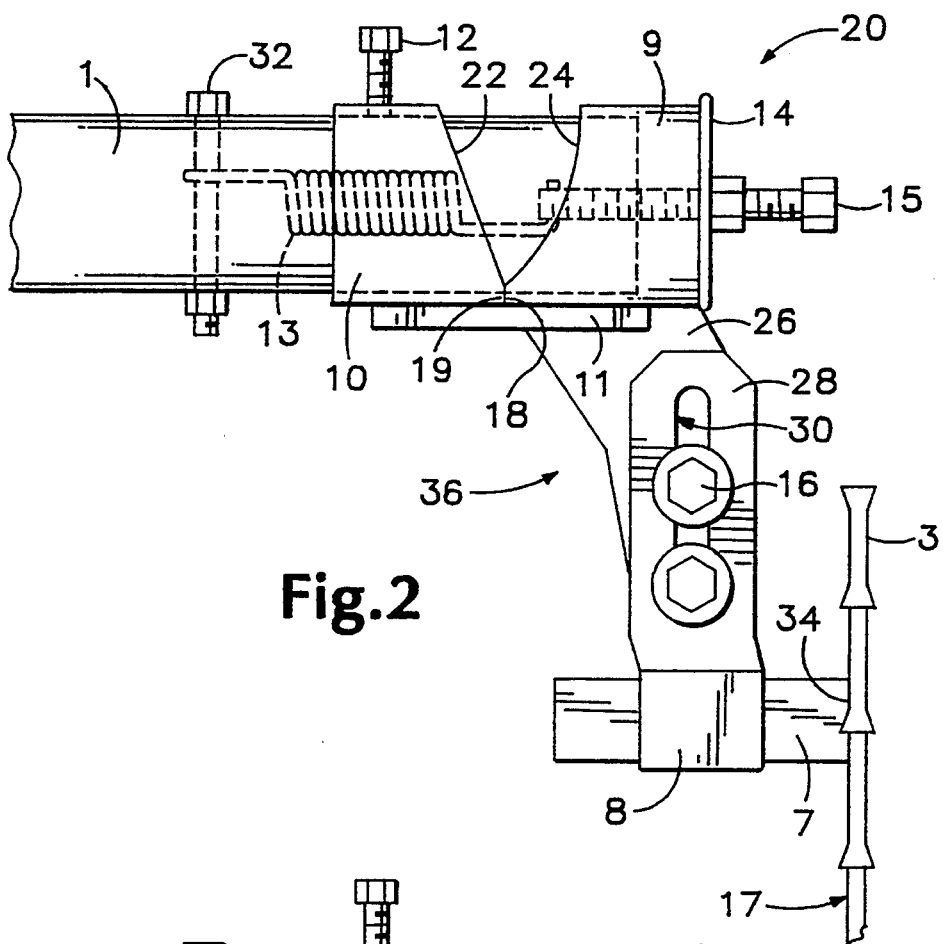
FIG. 2 shows the guide arm of the guidance device in contact with the saw blade.

FIG. 2 ms an detailed back view of the guidance device 20 shown in FIG. 1. The guidance device 20 includes a mounting sleeve 10 and a guide arm sleeve 9 that both insert around the mounting pipe 1. A stop peg 11 is welded to the bottom of mounting sleeve 10 providing a stop for guide arm sleeve 9. A cap screw 12 extends through mounting sleeve 10 and clamps onto pipe 1 rigidly holding mounting sleeve 10 to pipe 1. Mounting sleeve 10 includes a diagonally angled side surface 22 which is held in compression against an oppositely inclined diagonal surface 24 on the guide arm sleeve 9.

A guide arm assembly 36 is welded to guide arm sleeve 9 and includes a guide arm 26 joined at a bottom end to an adaptor member 28 having a vertically aligned slot 30 for receiving cap screws 16. A bottom end of guide arm 26 and a bottom end of adaptor member 28 are joined to opposite ends of a guide tube 8. Guide tube 8 holds a rod 7. Guide arm 26, adaptor member 28, guide tube 8 and rod 7 are referred to as the guide arm assembly 36.

Surface 24 of the guide arm sleeve 9 is slightly concave to create a lateral motion in the guide arm assembly 36 as will be further described below. The bottom of surface 24 contains a small flat section 18 that matches a small flat section 19 at the bottom of surface 22. A spring 13 is held in tension at a first end by a bolt 32 and at a second end by a tension adjusting cap screw 15. The cap screw 15 extends through a washer 14 located at the end of guide arm sleeve 9. The spring 13 holds the two sleeves together in compression. The two flat portions 18,19 when aligned allow sleeves 9 and 10 to remain in a lowered static condition as shown in FIG. 1.

The rotation direction of the saw blade 3 imparts some frictional force to rod 7 at a contact point 34. Stop peg 11 serves to prevent rotation of guide arm assembly 36 in the direction of rotation of saw blade 3 past the lowered position shown in FIG. 1.

Figure 3:
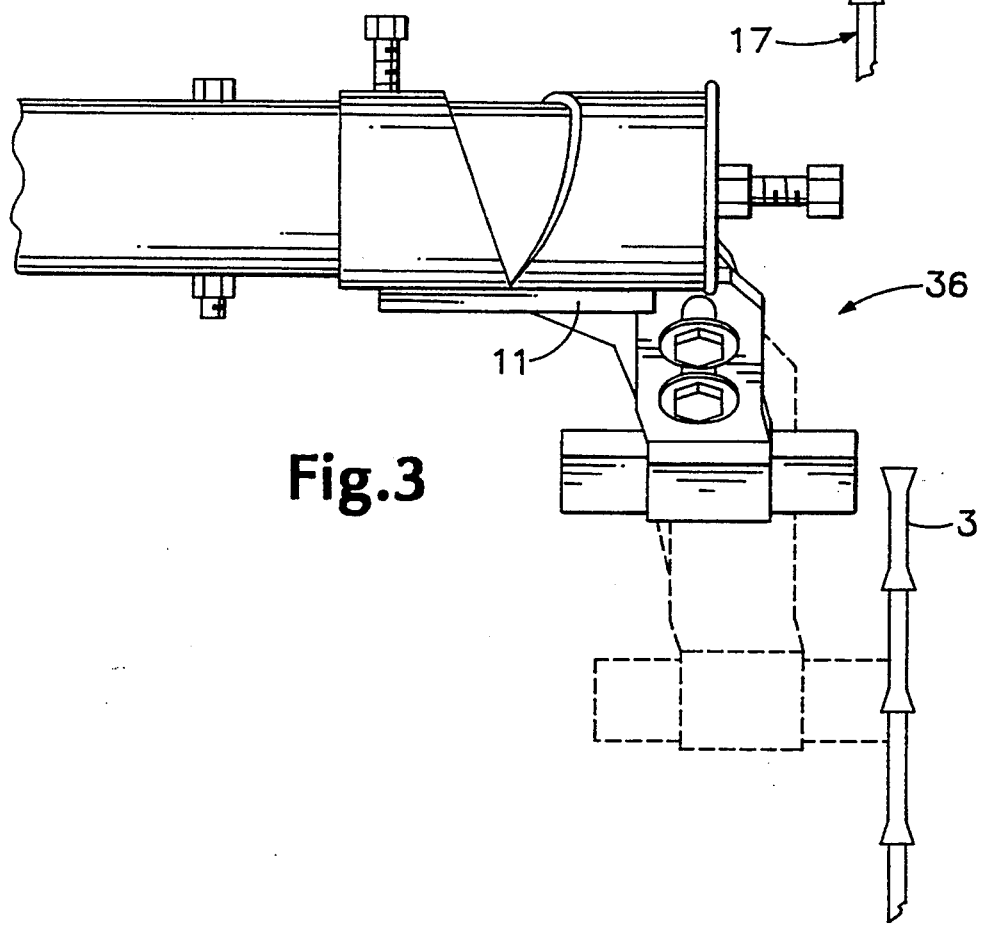
FIG. 3 shows the guide arm moves laterally away from the saw blade.

Referring to FIG. 3, if the guide arm assembly 36 is rotated away from the stop peg 11, in the opposite direction of the rotation of saw blade 3, the guide arm assembly 36 will also move laterally away from the saw blade 3. The force required to cause guide arm assembly 36 to rotate upward and move laterally away from saw blade 3 is adjustable by either loosening or tightening the cap screw 15.

Referring to FIGS. 1-3, a log 6 proceeding in a forward direction defined by arrow 37 passes through the saw blade 3 between lower guide 2 and the guide arm assembly 36. The rod 7 makes positive lateral contact with the side of saw blade 3 during the initial cutting of log 6 by saw blade 3. Thus, guide arm assembly 36 provides lateral support that keeps the saw blade 3 from vibrating and bending out of alignment with the vertically aligned rotational plane shown in FIG. 1.

If the log 6 has a larger diameter than the distance between the bottom end of guide arm assembly 36 and the guide 2, the front end of log 6 will contact the guide arm assembly 36 and thus dislodge it from the static condition shown in FIG. 1. The guide arm assembly 36 will then rotate in an upward direction while at the same time moving laterally away from the saw blade 3 as shown in FIG. 3. Thus, the log is allowed to pass underneath the guide arm assembly and pass completely through saw blade 3.

To restore the guide arm assembly 36 to its original static condition as shown in FIGS. 1 and 2, the guide arm assembly 36 is manually rotated downward. The spring 13, washer 14 and tension adjustment cap screw 15, hold the guide arm sleeve 9 in contact with the mounting sleeve 10. This assures that the guide arm assembly 36 is returned to its former position without contacting saw teeth 17.

To reduce vibrations in saw blade 3, the guide arm assembly 36 is preferably located within 80 degrees of where the saw blade initially enters into the log 6. Thus, guide arm assembly 36 reduces vibration in saw blade 3 when cutting into log 6, in turn, creating a uniform surface on the cut sides of log 6. In one embodiment, the rod 7 presses against the side of saw blade 3 with a force of between 0.00 and 0.005 pounds of pressure.

If a length of material to be sawn is to exceed the diameter of the blade it must pass the arbor. This dictates that less than half the diameter of the saw is available for such work. Placing a standard guide in this zone would reduce the capacity of the blade further. However, the breakaway guide 20 when positioned in this working upper half of the saw blade 3 does not reduce blade capacity.

When pieces of wood having greater heights are encountered the entire upper half of the profile of saw blade 3 may be needed to cut completely through the log from top to bottom. An advancing material moving forward into the front edge of the saw blade makes contact with the guide arm assembly 36 and pivots arm assembly 36 in the same direction that the log 6 moves through the saw blade 3 (see FIG. 3).

The oppositely inclined surfaces 22 and 24 in sleeves 9 and 10, respectively, cause the outside sleeve 9 which is affixed to the guide arm assembly 36 and the tube 1, to also move laterally out away from saw blade 3.

It is important that the guide arm assembly 36 also moves laterally sideways away from the now unsupported and much weaker saw blade 3 so that, although not desired, the saw blade 7 can deviate or weave from its intended tract or position without encountering the guide arm assembly 36.

Thus, logs that extend above the lowest point of guide arm assembly 36 can still be cut by saw blade 3. When a new log is cut that has a height that does not extend up to the bottom of arm assembly 36, the guide arm assembly 36 is restored to its original static or lowered position so that rod 7 again presses against the side of saw blade 3 as previously shown in FIGS. 1 and 2 providing the original lateral support to saw blade 3.

I claim:

1. An apparatus for supporting and operating a circular saw blade while cutting a work piece, comprising:
    a support member extending above a top edge of the saw blade;
    a guide arm assembly rotatably attached to the support member and extending down along a side of the saw blade while in a static condition, the guide arm assembly rotatable by the work piece about the support member as said work piece is directed through the saw blade;
    a guide arm member extending from the guide arm assembly and making low friction contact with at least one side of the saw blade, the guide arm member thereby providing lateral support for the saw blade while the guide arm assembly is in the static condition and extending out from a forward path of the work piece while said work piece is being cut by the saw blade; and
    tension adjustment means for varying an amount of contact force required to be exerted by the work piece against the guide arm assembly to rotate said guide arm assembly, therein said tension adjustment means comprising a screw coupled to the guide arm assembly and a spring held by the screw, whereby the contact force can be adjusted by loosening or tightening the screw against the spring.

2. An apparatus according to claim 1 wherein the support member comprises a cylindrical pipe extending perpendicular to the saw blade.

3. An apparatus according to claim 1 including lateral displacement means for causing the guide arm assembly to move laterally away from the saw blade while said guide arm assembly is being rotated about the support member.

4. An apparatus according to claim 1 wherein the guide arm member comprises a rod inserted through a guide tube formed in a bottom end of the guide arm assembly.

5. An apparatus for supporting and operating a circular saw blade while cutting a work piece, comprising:
    a support member extending above a top edge of the saw blade, the support member comprises a cylindrical pipe extending perpendicular to the saw blade;
    a guide arm assembly rotatably attached to the support member and extending down along a side of the saw blade while in a static condition, the guide arm assembly rotatable by the work piece about the support member as said work piece is directed through the saw blade;
    a guide arm member extending from the guide arm assembly and making low friction contact with at least one side of the saw blade, the guide arm member thereby providing lateral support for the saw blade while the guide arm assembly is in the static condition and extending out from a forward math of the work piece while said work piece is being cut by the saw blade; and
    lateral displacement means for causing the guide arm assembly to move laterally away from the saw blade while said guide arm assembly is being rotated about the support member, the lateral displacement means including a mounting sleeve rigidly attached to the support member and a guide arm sleeve rotatable about the support member, the sleeves including opposed angled surfaces held together in compression.

6. An apparatus according to claim 5 wherein the sleeves are held in compression by a spring, the spring having a first end joined to the support member and a second end joined to the guide arm sleeve.

7. An apparatus according to claim 6 including adjustment means for varying the amount of force in which the sleeves are held together.

8. An apparatus according to claim 7 wherein the adjustment means include a laterally displaceable screw attached to an outside face of the guide arm sleeve and receiving the second end of the spring.

9. An apparatus according to claim 5 wherein the mounting sleeve includes a stop peg extending transversely across a front face of the guide arm assembly thereby restricting rotation of the guide arm assembly in a direction of rotation of the saw blade while said guide arm assembly is in the static condition.

10. A guide for supporting and operating a saw blade, comprising:

a support member;

a guide arm assembly rotatably attached to the support member and making contact with at least one side of a working surface of the saw blade, the working surface defined as a portion of the saw blade that at any one instance is capable of cutting into a work piece; and means for rotating the guide arm assembly onto an outside surface of the work piece as said work piece is being cut by the saw blade, the guide arm assembly thereby providing lateral support for the saw blade while at the same time keeping the entire working surface of the saw blade available for cutting the work piece;

the rotating means comprising a first sleeve rigidly attached to the support member and having a diagonally inclined face and a second sleeve having a concave face angled in an oppositely inclining orientation with the face of the first sleeve.

11. A guide according to claim 10 wherein the faces of the first and second sleeves each include a flat surface section that are aligned together when the guide arm is in a static condition.

* * * * *